HIGH POWER SEMICONDUCTOR LASER DEVICES

Filed April 18, 1966

Inventors:
Marvin Garfinkel;
William E. Engeler,
by John F. Ahern
Their Attorney.

United States Patent Office
3,303,432
Patented Feb. 7, 1967

3,303,432

HIGH POWER SEMICONDUCTOR LASER DEVICES

Marvin Garfinkel, Schenectady, and William E. Engeler, Scotia, N.Y., assignors to General Electric Company, a corporation of New York Filed Apr. 18, 1966, Ser. No. 543,305
17 Claims. (Cl. 331—94.5)

This application is a continuation-in-part of our co-pending application Serial No. 299,220, filed August 1, 1963, which in turn is a continuation-in-part of our abandoned application Serial No. 286,667, filed June 10, 1963, both of the above applications being assigned to the assignee of the present invention.

The present invention relates to improved high power density semiconductor devices and particularly to such devices as are useful in the generation of stimulated coherent emission.

Coherent stimulated emission of light and other electromagnetic radiation from semiconductor devices has recently been achieved. Several structures which may be utilized for such generation and materials therefor are described and claimed in U.S. Patent No. 3,245,002, of Robert N. Hall, issued April 5, 1966, the specification of which is incorporated herein by reference. In accord with the Hall invention, coherent stimulated emission is achieved by band-to-band emission at a degenerately doped P-N junction in direct transition semiconducting compounds, as for example, gallium arsenide and gallium arsenide-phosphide. The junction is made as a portion of a Fabry-Perot-type resonator and stimulated emission is emitted along the plane of a junction through at least one edge thereof. Due to the extremely high current densities utilized in this type of laser device, efficiencies of light emission are of the order of 30 or 40 percent, the remaining energy input being converted into heat. The removal of this heat becomes a sufficiently difficult problem as to be nearly prohibitive. In some instances the laser has been operated by pulses of electric current to allow the heat to dissipate between the pulses and thus avoid destruction or distortion.

Pulsed operation involves several disadvantages. Due to varying power input as a function of time, the light output is not constant, even during any given pulse. Additionally, since the amount of time that the laser is in the state of emitting coherent light is the only time during which it may convey information or be modulated, it is advisable that means be devised for operating lasers continuously. This requires a solution of the heat removal problem.

Accordingly, it is one object of the present invention to provide a semiconductor laser device which may be operated continuously without the destruction thereof.

It is a further object of the present invention to provide a semiconductor laser structure having suitable heat dissipation characteristics to operate continuously.

It is still another object of the present invention to provide means, apparatus and methods for the construction of continuously operating semiconductor laser devices.

It is yet another object of the present invention to provide structure for semiconductor devices, including semiconductor laser devices which are capable of operation at hitherto unobtainable continuous power densities.

Briefly stated in accord with one feature of the present invention a semiconductor device, as for example, a laser diode of a direct transition semiconductor material, such as gallium arsenide, is fabricated with a planar junction therein. The respective N- and P-type regions bounding the junction are ground to a minimal thickness in order to minimize resistance to heat flow and the diode is rigidly mechanically, thermally, and electrically connected between a pair of heat conducting electrodes which are of much greater size than the diode itself and which match the coefficient of thermal expansion of the material from which the device is constructed by alloying therebetween with the aid of an extremely thin, minimal thickness, layer of a suitable metallizing coating. An interposed electrically insulating but thermally conducting layer separates the two plates occupying the area therebetween which is not occupied by the diode, maintains mechanical strength and stability, and facilitates heat removal. Electrical contact to the device is made to each of the respective electrodes which are much larger in area than the laser diode itself. One of the electrodes is connected to a suitable heat sink.

In accord with another feature of the invention, the geometry of a laser diode is provided with angular surfaces to cause total internal reflection of light in one direction and the emission of a directional beam of coherent light in the opposite direction and substantially in the plane of the P-N junction. This feature may be combined with the heat removal electrode means of this invention, or applied to any semiconductor laser having a planar junction configuration.

The novel features which are characteristic of the present invention are set forth with particularity in the appended claims.

The invention itself, together with further objects and advantages thereof, may best be understood with reference to the following detailed description taken in connection with the drawing in which.

Figure 1:
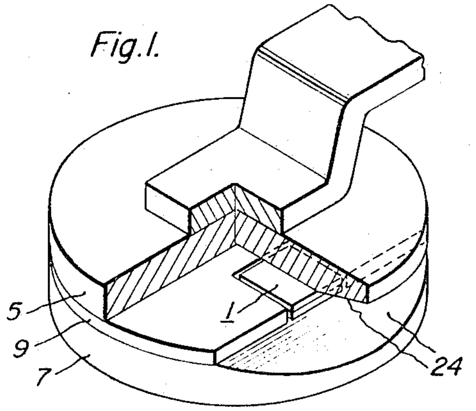
FIGURE 1 is a perspective view with parts broken away of a semiconductor laser device constructed in accord with one feature of the present invention.

The laser device of FIGURE 1 comprises a laser diode represented generally as *l* including an N-type region 2 and a P-type region 3 with an interposed P-N junction region 4 therebetween. Both N- and P-type regions are impregnated or "doped" with a sufficient quantity of donor or acceptor impurities respectively as to render the regions degenerate.

As used herein a body may be considered to be degenearte N-type when it contains a sufficient concentration of excess donor impurity carriers to raise the Fermi level thereof to a value of energy higher than the minimum energy of the conduction band on the energy band diagram of the semiconductive material. Likewise a body may be considered to be degenerate P-type when it contains a sufficient concentration of excess acceptor impurity carriers sufficient to depress the Fermi level to an energy level lower than the maximum energy of the valence band on the energy band diagram for the semiconductive material. Degeneracy is usually obtainable in gallium arsenide, for example, when the excess negative conduction carrier concentration exceeds $10^{17}$ carriers per cubic centimeter or when the excess positive conduction carrier concentration exceeds $10^{18}$ carriers per cubic centimeter. The Fermi level of such an energy band diagram is that energy at which the probability of there being an electron present in a particular state is equal to one-half. The materials from which laser diode *l* may be constructed are generally direct transition compound semiconductors of the group III–group V (of the Periodic Table) class which are adapted to direct transitions of electrons between valence and conduction bands, and may include, for example, gallium arsenide, indium antiminide, indium arsenide, indium phosphide, gallium antiminide and alloys therebetween; and may further include direct transition alloys of other materials such as alloys of gallium arsenide and gallium phosphide (indirect by itself) in the range of 0 to 50 atomic percent of gallium phosphide. For a further discussion of direct transition semiconductors reference is hereby made to an article by H. Ehrenreich in the Journal of Applied Physics, vol. 32, page 2155 (1961). Other suitable direct transition semiconductive materials include lead sulphide, lead selenide and lead telluride. In these latter classes of materials indium is suitable as a donor and excess anion is suitable as an acceptor. The wavelength of the emitter radiation depends upon the band gap (the energy difference between the conduction band and the valence band of the chosen semiconductor). In the other materials suitable for use as a semiconductor laser, namely, the direct transition compounds of the group III-group V class utilize sulphur, selenium or tellurium as donors and zinc. cadmium, mercury, or manganese as acceptors. Additionally certain materials in group IV of the Periodic Table of the elements, namely, tin, germanium and silicon may serve as either donors or acceptors in certain materials. For example, in gallium antimonide grown from a stoichiometric melt they are all acceptors. In indium antimonide, tin is a donor, whereas germanium and silicon are acceptors. In the remaining direct transition semiconductors of the group III–group V, tin, germanium and silicon are all donors. While applicable to the materials listed herein, for simplicity and clarity the invention will be described with reference to gallium arsenide laser devices.

Semiconductor laser diode *l* is a monocrystalline wafer of small dimensions, typical lateral dimensions being approximately 0.3 millimeter on both sides, with a thickness of approximately 50 to 200 microns, and preferably 50 to 100 microns. Junction 4 is very thin, within the range of approximately 200 to 1000 A.U. When originally formed in the N-P structure the thickness of the wafer is usually much greater but the N and P-type regions are polished and ground so as to make the distance from the exterior major surface of either the N- or P-type region to the junction as small as possible, and in some instances the distance between the exterior major surfaces of the P-type region of the crystal and the junction has been maintained at as little as 5 microns. In general, however, it is the object to reduce the dimension from the junction to the surface of either the N or the P-type region of the crystal in order to reduce both the thermal and electrical resistance and thus both reduce resistive heating and facilitate heat removal from the diode. This is particularly and unexpectedly important in degenerate gallium arsenide, since it has been found that degenerate doping, while increasing the electrical conductivity, reduces the thermal conductivity, as reported by Carlson, Slack and Silverman, General Electric Research Laboratory Report 64–RL–3762G, dated September 1964. It is more important for the P side, which should be 25 microns thick or less, because the P-type region is more heavily doped and generally has a thermal resistance of about 10 times that of the N-type gallium arsenide. Thus at 20° K., the thermal conductivity in watt/cm. deg. (K.) of the N region is usually about 20, whereas that of the P-type region is usually about 2. After the wafer has been formed and appropriately diffused to produce the necessary P-N junction structure and after one major surface of the wafer has been polished and the front and rear edge surfaces are polished to optical smoothness and to exact parallelism, in accord with the teaching of the aforementioned Hall patent in order to provide a resonator for a standing wave pattern therein as to achieve coherent emission, the diode and interposed wafer are then fastened to the electrodes 5 and 7.

Electrodes 5 and 7 are formed from a material having a thermal expansion which matches that of the laser diode material as nearly as possible over the entire range of temperatures experienced by the laser diode. This ranges from the lowest temperature at which the diode is operated to the highest temperatures used in the fabrication of the structure. For most semiconductors examples of appropriate materials are Cr. BeO, W, Mo, Si, diamond, and gallium arsenide. The choice of the material used is determined by the temperature of the heat sink. In general that material is chosen which has the highest thermal conductivity between the temperature of the heat sink and diode operating temperature. Of the above enumerated materials the high purity metals (tungsten and molybdenum) may be used at temperatures ideally at temperatures of 30° K. or less. High purity silicon having a concentration of impurities of the order of $10^{17}$ atoms per cc. or less is most useful at ranges of approximately 30° K. to 200° K. High purity diamond having a concentration of impurities of the order of $10^{18}$ atoms per cc. or less is most useful at approximately 200° K. or 300° K.

Diode 1 is mounted between a pair of massive electrodes 5 and 7 which have unusual electrical and thermal properties, as will be more fully discussed below. One important function performed by electrodes 5 and 7 is to carry away from diode 1 the heat generated at the junction due to the extremely high current density, which typically may be from 5000 to 50,000 amperes per square cm., rapidly enough to prevent overheating of the diode. To do this the electrodes are massive as compared with the diode and are prepared so as to have electrical and thermal resistance which is vanishingly small as compared with the diode. To accomplish this with tungsten, which has a thermal coefficient of expansion which very closely matches that of gallium arsenide at low temperatures, the area must be very large. We have found that with a symmetrical configuration, the lateral dimension should be from 5 to 20 times that of the diode, so as to yield an area ratio of from 25 to 400 electrodes to diode. Such a structure raises a problem of fragility. It is virtually impossible for such a small diode to be rigidly connected between such large electrodes without being so fragile its mechanical destruction is inevitable.

We have been able to solve this problem, and to achieve an unexpected benefit in heat dissipation characteristics by providing a spacer 9 between the two electrodes which occupies substantially all the space therebetween; which has substantially the same thermal coefficient of expansion as the diode and which is of greater electrical resistance than the diode so as not to short it out; and which has substantially less thermal resistance than the diode to aid in heat dissipation. More specifically, when the diode is of degenerately doped gallium arsenide, the spacer is of electrically intrinsic, "high purity" gallium arsenide which is at most only lightly, as for example less than $10^{16}$ atoms per cc. of oxygen or copper doped. Since, in semiconductors, heat conduction is by lattice vibrations, or phonons, as opposed to electrons in metals, the thermal conductivity of a semiconductor does not parallel the electrical conductivity as in metals. Thus, the gallium arsenide spacer 9 has a thermal conductance at least approximately 10 times greater than the diode and an electrical conductance at least approximately 10 times less than the diode, which may be about 20 to 50 mhos at all temperatures.

Electrodes 5 and 7 are chosen to serve the heat removal function best throughout the temperature range from the temperature of a heat sink to which the device is generally connected in operation, which may be from 4° K. to 77° K. for example, to the temperature at which the junction operates under high power densities, which typically approach $3\times10^3$ watts per square centimeter of junction area when the device is operated in connection with a heat sink which is maintained at 77° K. On the other hand when the device is operated in connection with a heat sink maintained at a temperature of 300° K. the power density may be of the order of $2\times10^5$ watts per square centimeter of junction area.

The purity of electrodes 5 and 7 is of great importance since it has been found that high thermal conductivity is intimately connected with high purity. This is particularly true when the electrodes are operated in thermal contact with a heat sink which is maintained at a temperature which is of extremely low value as, for example, 77° K., or at the temperature of liquid hydrogen. As an example of this, in the fabrication of devices in accord with the present invention, the purest known and available tungsten, having resistivities of the order of $10^{-10}$ ohm cm. at 4° K. has been used. As is well known in metals, thermal and electrical conductivity parallel each other at these temperatures since both depend upon free electrons. It is also well known that the measure of purity of metals is the ratio of room temperature resistivity to residual resistivity measured, for example, at 4° K. The tungsten described above exhibited such a ratio of approximately 66,000. The best normally available chemically pure tungsten typically exhibits such a ratio of approximately 15,000. Such resistivities are far lower than those which are obtainable with commercial grade sheet or rod tungsten normally used in device fabrication which typically have a ratio of the order of 100. It is essential, in accord with the present invention, that such high thermal conductivity be obtainable because for the operation of a laser device continuously and/or at high power densities it is essential that the heat removal characteristics from the junction be optimized. Therefore the tungsten used should be of the 15,000 ratio purity or higher.

Another way of specifying the requisite purity of the electrode materials used is a direct measurement of thermal conductivity. This is also a measure of one characteristic of spacer 9. Thus, while tungsten suitable in fabricating devices in accord with the present invention is tested, it is found to have a thermal conductivity (K.) of from 200 to 600 watts/cm. deg. (K.) at approximately 4° K. depending upon whether it is merely "high-purity" or "highest purity." It will be appreciated however that, the higher the thermal conductivity of the electrodes, the better suited they are, without limit. Commercial grade sheet and rod tungsten (normally used in device fabrication), on the other hand, typically has a thermal conductivity of only a few, say 2, watts/cm. deg (K.) The "high purity" undoped gallium arsenide used as spacer 9 typically has a thermal conductivity of from 20 to 40 watts/cm. deg. (C.), as compared with a conductivity of from 2 to 10 w./cm. deg. (C.) for degenerately doped gallium arsenide.

While the devices of the present invention may utilize a high purity material which matches the thermal expansion of the semiconductor utilized, for purposes of ease of description the invention will be described herein as utilizing high purity tungsten as applied to a gallium arsenide laser diode wafer. Electrodes 5 and 7 are electrically and mechanically fused to the opposite major surfaces of laser diode *1* by suitable techniques to cause non-rectifying contacts therewith.

Since a prime objective of the invention is to remove heat from the junction 4 as rapidly as possible, it follows that every element or substance that impedes the flow of heat should be eliminated or minimized. Solder is a case in point. A solder layer is a poor thermal conductor at low temperatures, even if made of a normally good conductive metal. Ideally, the tungsten should be bonded directly to the gallium arsenide. Unfortunately, the two will not fuse without being metalized. When however, at least one surface is metalized by depositing a thin film of a suitable metal to the surface, placing the two surfaces together, and heating to high temperatures, the gallium arsenide fuses to the tungsten, with at most a few microns of metalizing metal to aid the fusion.

Such fusion may, for example, be accomplished by first plating the tungsten electrodes 5 and 7 with a suitable wetting agent as, for example, electroless nickel, then firing the nickel plated tungsten at a temperature which is high enough to melt and fuse the nickel into the tungsten surface. Such temperature may conveniently be from approximately 850–1000° C. The surface of the fused tungsten is then coated with a very thin film of a suitable bonding agent such as silver or gold which may be doped with a material which will provide a non-rectifying contact to the portion of the wafer to which contact is to be made. Thus, for example, a thin layer of silver and tin may be coated upon the electrode 5 which contacts the N-type portion. A thin layer of indium doped silver may be plated over the electrode which is to contact the P-type portion 3 of gallium arsenide diode 1. Such plating may be by vacuum evaporation or by electro-deposition. As a matter of practice, and for convenience, this alloying is done in separate steps. Conveniently, the indium doped silver plated electrode is positioned with the gallium arsenide diode and the intermediate wafer in position as shown in FIGURE 1 of the drawing with the P-type side of the diode facing downwardly in contact with electrode 7.

Figure 2:
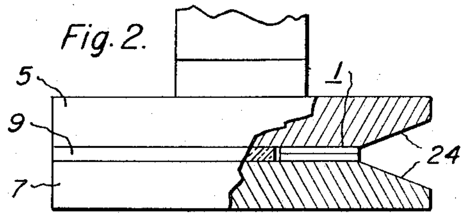
FIGURE 2 is a cross-sectional view of one edge of the device of FIGURE 1.
Figure 3:
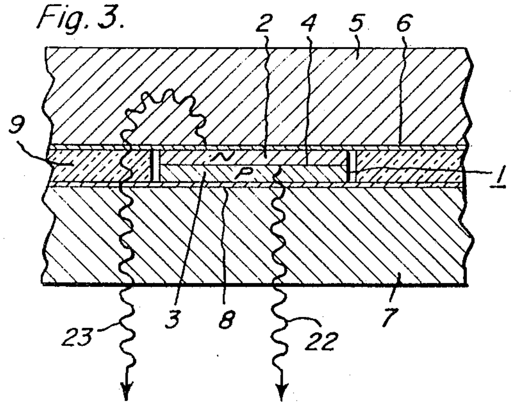
FIGURE 3 is an enlarged cross-sectional view of the portion of the device of FIGURE 1 which includes the laser structure.

In practice in the disc shaped configuration illustrated in FIGURES 1–4 the two electrode discs 5 and 7 are beveled as illustrated in FIGURES 2 and 3 so that the face of each electrode which contacts the diode actually has a chord removed and presents a linear edge which coincides with the exposed edge of diode 1. The degree of the bevel may advantageously be 20° to 30° to allow the diode to be recessed without impeding the laser beam which may diverge as much as 20°. Such beveling has the advantage of allowing the recessing of the diode to allow for a better heat flow pattern, since the closer to the center of the discs 5 and 7 that the diode 1 is located, the more ideal is the heat flow pattern. The assembly is then heated in a sutiable atmosphere which is inert to the constituents utilized, as for example pure dry hydrogen, to a temperature sufficient to alloy and bond the gallium arsenide diode and intermediate wafer 9 of the tungsten electrode 7 with the diode surface in non-rectifying contact, as for example from 400–700° C. This temperature is maintained for the order of one minute and the assembly is removed and allowed to cool. Disk 9 is of high electrical resistivity, high thermal conductivity semiconductor, ideally of the same material composing diode 1, in this instance gallium arsenide, having a notch 10 cut in one edge thereof or otherwise shaped to accommodate diode 1, should diode 1 be otherwise located.

As mentioned hereinbefore the wafer 9, being a semiconductor can be a good thermal conduction and a poor electrical conductor. Its bulk electrical resistivity is usually of the order of $10^6$ ohm centimeters, insuring that is, in fact, an electrical insulator as compared with the heavily doped laser diode 1. On the other hand, the thermal conductivity can compare favorably with the thermal conductivity at the electrodes 5 and 7, as for example K may be 20 to 40 w./cm. deg. (C.) as compared to 200 to 600 w./cm. deg. (C.) for tungsten electrodes as used herein. Although this is not as high, it is not a serious impediment because the spacer is so thin, i.e., 100 microns or less. After bonding, the interstices between the laser diode and wafer 9 are filled with a suitable removable potting compound, as for example, glycol phthalate, and the entire top surface is lapped and ground to remove any excess material and to establish a common plane for the upper surface of the laser diode and of the high electrical resistivity gallium arsenide disk. This final lapping should be carefully controlled so as not to cut into the N-type region of the laser diode to the extent that the P-N junction is exposed.

In general, the aim in grinding is to approach as close as possible to the P-N junction with the finally lapped and ground surface of the N-region of the laser diode. As mentioned hereinbefore, both the P- and N-type regions should be thin, but not shorted out. The P-type region should preferably be no thicker than 25 microns and no thinner than a minority charge carrier (electron) diffusion length in the semiconductor. Similarly the N-type region should preferably be 50 microns or less thick, but at least the thickness of one minority charge carrier (positive hole) diffusion length in the semiconductor. The entire diode should not be more than 100 microns thick nor no less than 5 microns. The potting compound is then removed by dissolution, melting or otherwise. After the potting compound has been removed and the entire exposed surface cleaned, the second tungsten wafer 5, metalized with nickel and silver for example, is placed into position over the gallium arsenide laser diode and the gallium arsenide wafer 9 and the entire assembly is placed into a furnace and heated in an inert atmosphere to a temperature sufficient to cause alloying between the gallium arsenide and the plated tungsten wafer. Such a temperature may conveniently be approximately 25–50° cooler than the temperatures utilized for the first alloying step. Moderate pressure is applied to the sandwich to insure intimate contact during both bonding steps.

It will be noted that high temperatures and high temperature constituents were used in the first bonding step. This facilitates the operation of the second bonding step at operative temperatures wthout incurring the risk of disturbing the already-formed bond. Similarly the temperatures and bonding constituents used in the second step are so chosen as to allow for thermally bonding the composite device to a heat sink and connecting electrical leads thereto wtihout risk of damage to the device. As illustrated in FIGURE 2 both major surfaces of both electrodes are coated with a wetting agent to render them solderable to facilitate attachment of leads and attachment to a heat sink. After the diode 1 and the intermediate wafer have been secured, by alloying between electrodes 5 and 7, the resulting structure is of substantially the same thickness as before, with the fused metalizing metals alloyed into the respective faces, leaving only a thin layer of a few microns or less thickness of the bonding material between. Such thicknesses have been as little as 0.25 micron. Such an alloy contact offers little in the way of resistance to flow of heat as compared to a normal solder joint wherein a relatively thick layer of solder (which has very high thermal resistance at low temperatures) remains between members.

Figure 4:
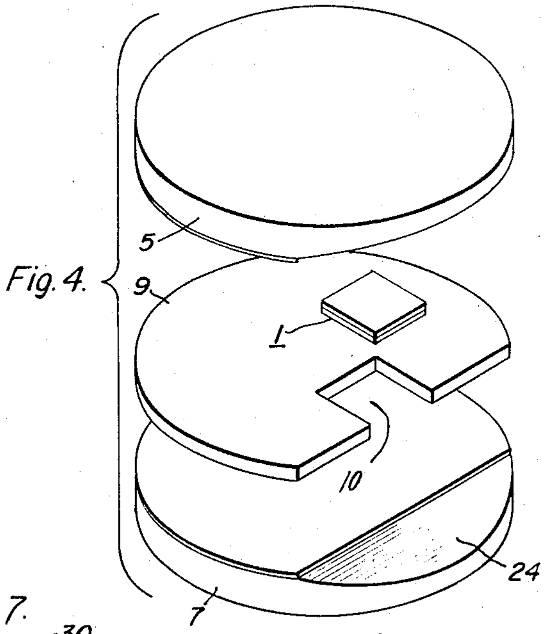
FIGURE 4 is an exploded view of the device of FIGURE 1 which is helpful in understanding its method of construction.

In FIGURE 4 of the drawing, there is shown an exploded view of the device of FIGURE 1 indicating the way in which the components fit together upon assembly. As may be noted from FIGURE 4, laser diode 1 fits within the aperture 10 in gallium arsenide spacer 9 and the composite disk formed thereby is readily made of the same dimension so that the composite wafer may readily fit between tungsten electrodes 5 and 7 and be alloyed thereto to form a unitary structure which has mechanical strength to withstand thermal stresses associated with fabrication and subsequent use.

Figure 5:
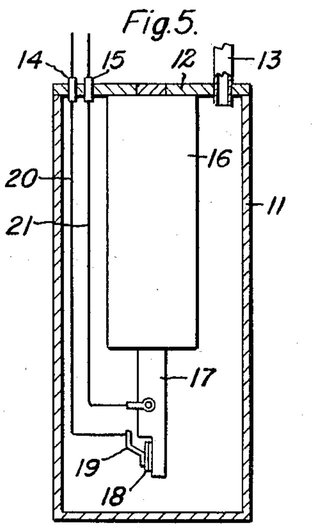
FIGURE 5 is a cross-sectional view of a complete apparatus with which the device of FIGURE 1 may be operated.

A manner in which low operating temperatures may be obtained is illustrated in one embodiment in FIGURE 4 of the drawing. FIGURE 5 is a graphic illustration of a cryostatic device and includes an outside evacuable envelope 11 having an end cap 12 with a tubulation 13 therein for evacuating the device and a pair of insulated input lead connections 14 and 15. Within envelope 11 and attached to closure 12 is a container 16 which may be filled with a thermal fluid, as for example liquid nitrogen, liquid air, liquid hydrogen or liquid helium for the attainment of a very low temperature therein. On the lower end of, and in intimate thermal contact with, container 16 there is a thermal sink in the form of a solid bar, which may for example be of copper, having a planar surface 18 cut thereinto to which the composite laser device 19 (the device of FIGURE 1) of the invention may be attached. Lead wires 20 and 21 are connected respectively to one heat removal disk of laser device 19 and to thermal sink 17 and passed through leadouts 14 and 15, respectively.

During operation at low temperatures the volume within envelope 11 is evacuated to a very low pressure as, for example, $10^{-6}$ mm. Hg through tubulation 13 to reduce heat losses. Heat sink 17 then assumes essentially the temperature of the thermal fluid contained in container 16. When a continuous high power input is supplied to laser device 19 through wires 20 and 21, the unused power applied to device 19 which appears as heat is readily carried away through heat sink 17 to the thermal fluid where it is dissipated by boiling of the thermal fluid. The cryostat illustrated in FIGURE 5 is relatively conventional. The modifications which make it possible to operate the semiconductor device of the present invention with such an arrangement are in the device itself as illustrated in FIGURE 1 of the drawing.

When maintained at low temperatures, as for example, the boiling point of liquid helium, liquid hydrogen, liquid nitrogen, or liquid air, when electrodes 5 and 7 are of sufficiently high thermal conductivity as set forth hereinbefore and when the thickness of the N- and P-type regions 2 and 3, respectively, are so small as to cause the thermal resistance between junction 4 and the outer edge of the electrodes to be small enough so that heat transfer from the junction is sufficient to allow for thermal equilibrium at the junction, at a temperature at which the normal semiconductive characteristics of the gallium arsenide device are not adversely affected, it is possible to obtain the generation of coherent stimulated light emission on a continuous basis and/or at high power levels without destruction of the laser diode 1. Heat flow from the diode is of a dual nature. First, heat is directly transferred through the P region of diode 1 (which is generally the thinner of the two regions of the diode and should preferably be as thin as 25 microns or less) directly through layer 8, which is of the order of a few microns or less, and electrode 7 which, in connection with laser diodes measuring 0.3 mm. on a lateral edge, has conveniently been approximately 1 mm. thick and 3 mm. in diameter, to the heat sink as is indicated by arrow 22. It is apparent from these dimensions that the drawing is not to scale. An additional path represented by arrow 23 for the flow of heat is from junction 4 upwardly through N-type region 2 of diode device 1, through layer 6, also of the order of a few microns thick, through a portion of electrode 5 back through layer 6, through undoped gallium arsenide layer 9, through layer 8, and through electrode 7 to heat sink 17. It is for this reason, namely the addition of such paths of heat flow, that gallium arsenide layer 9 should also be of high thermal conductivity as described hereinbefore. The thinness of layers 6 and 8 is to facilitate heat removal. Although thin, these metalizing layers are sufficiently thick, such as for example 1 micron, so that when used in connection with electrically insulating heat removal disks such as silicon or diamond, and completely coating the same, they may serve as the sole path of electrical connection between the semiconductor diode and external electrical connections.

Semiconductor diode laser device, as illustrated in FIGURE 1 of the drawing and as constructed as described hereinbefore, fabricated from gallium arsenide and 66,000 resistivity ratio tungsten, operating upon the Fabrey-Perot type resonator mechanism as described in the aforementioned Hall patent and emitting coherent stimulated light from the exposed lateral edge of the junction have been operated continuously at heat sink temperatures of 4–50° K. With the heat sink at approximately 20° K. the laser device has operated successfully emitting coherent light with continuous power inputs as high as approximately 10 watts and current densities of 6000 A./cm.$^2$. In operation, the coherent light emission is essentially that described in the afermentioned Hall patent but is continuous and, as such, may be more readily modulated. When so modulated, it may be caused to operate continuously at high, continuous power inputs and contain a very large amount of information as compared with a laser device operated upon a pulsed mode.

Figures 6, 7, 8:
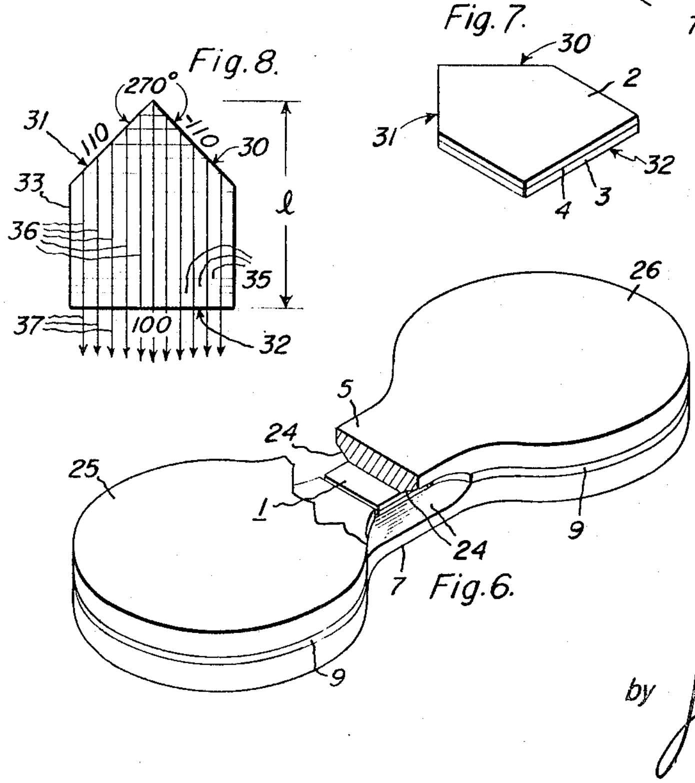
FIGURE 6 is a perspective view of another embodiment of the invention.
FIGURE 7 is a perspective view of a totally internally reflecting laser diode structure for emitting a directional beam of coherent light in accord with another feature of the invention.
FIGURE 8 is a diagrammatic plan view of the diode of FIGURE 7 illustrating the resonance modes therein.

FIGURE 6 is a perspective view of an alternative geometry for the device of FIGURE 1. In the device of FIGURE 1 light is emitted only from one edge of laser device 1 because of the desirability of having a multiplicity of heat flow paths away from laser device 1. We find that sufficient heat flow paths are present with the beveled edges 24 of electrodes 5 and 7 in any geometry which allows at least two different and low thermal resistance paths for lateral heat flow, as opposed to the three lateral, low resistance paths offered by the device of FIGURE 1. Thus in FIGURE 6, two main, lateral high thermal conduction paths lead to the two lobes 25 and 26 of electrodes 5 and 7 when diode 1 is located on an interconnecting channel.

This structure has the advantage that coherent radiation may be emitted from the diode 1 from either or both of two oppositely disposed edge faces which define the Fabry-Perot resonator.

FIGURE 7 is a perspective view of a laser diode similar to that of diode *l* of FIGURE 1 of the drawing, but constructed so as to provide total internal reflection of surfaces 30 and 31 and the emission of a directional beam of coherent light from surface 32.

The means and operation of total internal reflection are illustrated more fully in FIGURE 8. In accord with this feature of the invention surfaces 30 and 31 are mutually perpendicular and intersect side surfaces 33 and 34 at a 45° angle. This relationship is not important since surfaces 33 and 34 may subtend any angle with surface 32. They are also and necessarily inclined at approximately a 45° angle to surface 32 through which radiation is emitted. To achieve a resonant mode the distance *l* satisfies the relationship $$l=\frac{m\lambda}{2}$$

where λ is the wavelength of the emitted radiation in the material of the crystal and *m* is any integer 1, 2, 3 . . . . This is not the free space or vacuum wavelength $\lambda_0$, but is that number divided by the index of refraction of the material, *n*. Thus for gallium arsenide $\lambda_0$=8400 A.U., $n$=3.159 and λ=2340 A.U. approximately. With the relationship $$l=\frac{m\lambda}{2}$$

established, the crystal is cut to an appropriate length *l* and surfaces 30 and 31 are prepared to the angular relationship set forth hereinbefore. This relationship may be established by cutting and polishing surfaces 30, 31 and 32, but are preferably established by cleaving the crystal along suitable crystallographic planes as set by the Miller indices and co-ordinates *h*, *k* and *l* as is well known to those skilled in the art. Thus, with the junction 4 located in a plane of the class (1, 0, 0) the crystal may be cleaved along two planes of the class 110 that intersect at 90°. The front face may be established either by cutting and polishing or by cleaving along a second plane of the class (1, 0, 0) which is perpendicular to the plane of the junction. Examples of groups of crystal planes which may serve as surfaces 30, 31, and 32 respectively are the following:

(a) $\bar{1}10$; 110; 100
(b) 110; $\bar{1}10$; 010
(c) $\bar{1}01$; 101; 001

Other combinations will be readily apparent to those skilled in the art.

The structure embodied in this feature of the invention is of great advantage in that it provides means for defining a resonant cavity to permit coherent stimulated emission without achieving the exact parallelism of the Fabry-Perot resonator. It also permits for total reflection in one direction without silvering or otherwise coating the surface from which radiation is not wanted. Such silvering or equivalent coatings can possibly result in short-circuiting the P-N junction.

In FIGURE 8 of the drawing, lines 35 represent wavefronts in the standing wave pattern of the resonator. Lines 36 represent wave paths. It may be noted that each wave path from surface 32, intersecting surfaces 30 and 31, returning to surface 32 and passing therethrough as a directional beam of coherent emission, represented by arrow 37, is of the same length. When this length is governed by the relationship $$l=\frac{m\lambda}{2}$$

a resonant mode is established. In practice, in devices made in accord with this feature of the invention, *m* is approximately equal to 1000 and *l* is approximately 0.3 mm. This is much greater than the minimum size for the devices, and the size may be further reduced by reducing the dimension of sides 33 and 34.

Such advantages, although developed in connection with the heat removing structure described hereinbefore, are equally desired in any semiconductor laser device such as is set forth in the aforementioned Hall patent and this feature of the invention may be used without the heat dissipating means as set forth hereinbefore with equal advantage. This feature is, therefore, equally applicable to any semiconductor junction laser having a planar P–N junction.

While the invention, as described, relates primarily to semiconductor laser diodes, the structural principles described herein may be applied to other semiconductor devices, not stimulated coherent emission diodes to greatly increase the operating power levels by the improved heat removal and mechanical strength obtained herein.

While the invention has been described herein with respect to specific embodiments thereof, many modifications and changes will become apparent to those skilled in the art. Accordingly, we intend by the appended claims to cover all such modifications and changes as fall within the true spirit and scope of this invention.

What we claim as new and desire to secure by Letters Patent of the United States is:

1. A semiconductor device for operation at very high power densities and comprising:

(a) a first monocrystalline wafer of semiconductor material the thickness dimension of which is very small as compared with the length and width dimensions thereof having a first P-type region and a second N-type region;

(b) a substantially planar P–N junction at the interface of said first and second regions and substantially perpendicular to the thickness dimension thereof;

(c) a pair of electrode members composed of a material which substantially matches the thermal coefficient of expansion of said first semiconductor wafer, and having good thermal conduction characteristics and good electrical conduction characteristics, at least at the surface thereof, bonded in low thermal and electrical resistive contact to opposite major surfaces of said first semiconductor wafer;

(cc) the planar surface area of each of said electrodes being very much greater than the major surface area of said first semiconductor wafer;

(d) a second wafer of substantially intrinsic semiconductor, having a termal coefficient of expansion which substantially matches the coefficients of expansion of said first semiconductor wafer and said electrodes, bonded to and interposed between said electrodes and occupying substantially all the space between said electrodes not occupied by said first semiconductor wafer;

(dd) said second wafer having a high electrical resistance as compared to the electrical resistance of said first wafer and having a low thermal resistance as compared to the thermal resistance of said first wafer.

2. A semiconductor laser device as recited in claim 1 adapted to emit a high power beam of coherent stimulated emission and in which:

(a) said first and second regions of said first semiconductor wafer are doped to degeneracy and the P–N junction therebetween and constitutes a resonator for the creation therein of a standing wave of electromagnetic energy, and (b) means for applying to said electrode a unidirectional voltage to pass a unidirectional current through said first semiconductor wafer sufficient in magnitude to establish within said P–N junction a standing wave of electromagentic energy and a population inversion of excited states whereby a directional beam of coherent radiation is emitted through at least one edge surface of said first semiconductor wafer.

3. The semiconductor laser device of claim 2 wherein:

(a) two of the edge surfaces of said first semiconductor wafer are ground and polished to exact parallelism with one another so as to reflect a significant portion of radiant energy directed thereupon and form a Fabry-Perot type resonator, and (b) the remaining two of said edge surfaces are poor reflectors of radiant energy.

4. The semiconductor laser device of claim 3 wherein:

(a) said first semiconductor wafer has a total thickness of approximately 100 microns or less;

(b) said P-type region of said first semiconductor wafer has a thickness of approximately 25 microns or less; and (c) said P–N junction has a thickness dimension of approximately 200 A.U. to 1000 A.U.

5. The semiconductor laser device of claim 2 wherein:

(a) the area of the surface of the electrodes contacting opposite major surfaces of said first semiconductor wafer is greater than the major surface area of said first semiconductor wafer by a factor of approximately 25 to 400;

(b) said second semiconductor wafer is composed of essentially the same composition as said first semiconductor wafer, but is undoped and exhibits a thermal conductance of at least approximately 10 times that of the first semiconductor wafer and an electrical resistance of at least approximately 10 times less than that of said first semiconductor wafer; and (c) said first and second semiconductor wafers are fused to said electrodes in good mechanical, thermal and electrical contact.

6. The semiconductor laser device of claim 5 wherein the first semiconductor wafer is fabricated of a direct transition compound semiconductor selected from the group consisting of gallium arsenide, gallium arsenide-phosphide, indium antimonide, indium arsenide, indium phosphide, gallium antiminide, lead sulfide, lead telluride and lead selenide.

7. The device of claim 6 wherein the said wafer is gallium arsenide.

8. The device of claim 6 wherein the said device is gallium arsenide-phosphide.

9. The semiconductor laser device of claim 6 wherein the electrodes are composed of a material having a thermal conductance (K.) of a value of 200 watts/cm. degree (K.) or higher.

10. The semiconductor device of claim 8 wherein the electrode material is selected from the group consisting of tungsten, molybdenum, silicon, diamond, chromium and beryllium oxide.

11. The semiconductor laser device of claim 9 wherein the electrode material is tungsten having an electrical conductivity of the order of $10^{10}$ mhos at 4° K. and a ratio of room temperature resistivity to residual resistivity at 4° K. at least as high as 15,000.

12. The semiconductor laser device of claim 2 wherein:

(a) two edge surfaces of said first semiconductor wafer are perpendicular to the plane of said P–N junction and intersect each at an angle of substantially 90° so as to totally internally reflect radiation therein to permit a standing wave of electromagnetic energy to be established between said two surfaces on one hand and a third surface on the other hand;

(b) a third edge surface of said first semiconductor wafer perpendicular to the plane of said P–N junction and disposed at an angle of approximately 45° to the planes of each of said first and second edge surfaces, (c) said three edge surfaces and the boundaries of said P–N junction substantially defining a resonator structure for the generation of a standing wave of electromagnetic energy.

13. The semiconductor junction laser of claim 12 wherein said three lateral faces are so located as to define a plurality of totally internally reflected optical path lengths through said first semiconductor wafer each having an integral number of half wavelengths for emitted radiation within the material thereof to cause the formation of a standing wave therein.

14. The semiconductor junction laser of claim 13 wherein said first and second lateral surfaces are cleaved planes of the crystallographic class (1, 1, 0) that intersect at a 90° angle.

15. The semiconductor junction laser of claim 13 wherein the first and second surfaces are further perpendicular to the plane of said P–N junction which is of the class (1, 0, 0) and said third edge surface is of the class (1, 0, 0) and is perpendicular to the plane of the P–N junction.

16. The semiconductor laser device of claim 2 wherein:

(a) said electrodes are comprised of two large heat-conducting lobes interconnected by a relatively thin section which contacts said first semiconductor wafer thereat; and (b) each of two opposedly disposed edge surfaces of said first semiconductor wafer is in close juxtaposition to an exterior edge of said thin section of said electrode so as to permit the emission of a coherent beam of radiation from two opposed lateral surfaces of said first semiconductor wafer simultaneously.

17. The semiconductor laser device of claim 2 wherein:

(a) the surface of each of said electrodes in contact with said first semiconductor wafer is beveled by an angle of approximately 20° to 30° to permit recessing of said first semiconductor wafer for improved heat flow characteristics; and (b) said first semiconductor wafer is positioned between said electrodes substantially at the edge of said bevel so as to permit unimpeded radiation of coherent light therefrom.

References Cited by the Applicant

UNITED STATES PATENTS

| | | |
|---|---|---|
| 2,883,591 | 4/1959 | Camp. |
| 3,047,780 | 7/1962 | Metz. |
| 3,089,070 | 5/1963 | Ralph. |
| 3,245,002 | 4/1966 | Hall. |

JEWELL H. PEDERSEN, *Primary Examiner.*

E. S. BAUER, *Assistant Examiner.*